United States Patent [19]

Brackett et al.

[11] Patent Number: 4,631,853
[45] Date of Patent: Dec. 30, 1986

[54] CONTOURED FISHING ROD HANDLE

[75] Inventors: John E. Brackett, Minneapolis, Minn.; Larry J. Dahlberg, Grantsburg, Wis.

[73] Assignee: Fishing Designs, Inc., Minneapolis, Minn.

[21] Appl. No.: 842,309

[22] Filed: Mar. 21, 1986

Related U.S. Application Data

[63] Continuation-in-part of Ser. No. 610,609, May 15, 1984, Pat. No. 4,577,432, which is a continuation of Ser. No. 302,634, Sep. 15, 1981, abandoned.

[51] Int. Cl.$^4$ .............................................. A01K 87/00
[52] U.S. Cl. .......................................... 43/23; 43/18.1
[58] Field of Search ......................... 43/18.1, 23, 18.5; 273/81.3; 16/110

[56] References Cited

U.S. PATENT DOCUMENTS

| | | | |
|---|---|---|---|
| 2,018,923 | 10/1935 | Potter | 43/23 |
| 2,177,433 | 10/1939 | Hedge | 43/23 |
| 2,667,713 | 2/1954 | Stephens | 43/23 |
| 2,711,047 | 6/1955 | Shepherd | 43/23 |
| 2,839,864 | 6/1958 | Martin | 43/23 |
| 4,398,369 | 8/1983 | Wiebe | 43/23 |
| 4,577,432 | 3/1986 | Brackett et al. | 43/23 |

Primary Examiner—M. Jordan
Attorney, Agent, or Firm—Williamson, Bains, Moore & Hansen

[57] ABSTRACT

A fishing rod handle having a butt grip segment and a reel seat segment with both segments contoured to provide outwardly curved, laterally offset complimentary projections on one side of the handle in the area where the forwardly disposed reel seat joins the front end of the butt grip. The contoured projections merge to provide a continuous, smoothly contoured projection adapted to fit comfortably into the palm of the user's hand when palming the butt grip, reel, and reel seat. The curved palming grip projeciton, which may take the form of a partial helix, affords improved mechanical advantage towards resisting rod twisting. In combination with a rod blank extending through the reel seat segment and into the butt grip segment, strength, light weight construction, and sensitivity are achieved.

11 Claims, 2 Drawing Figures

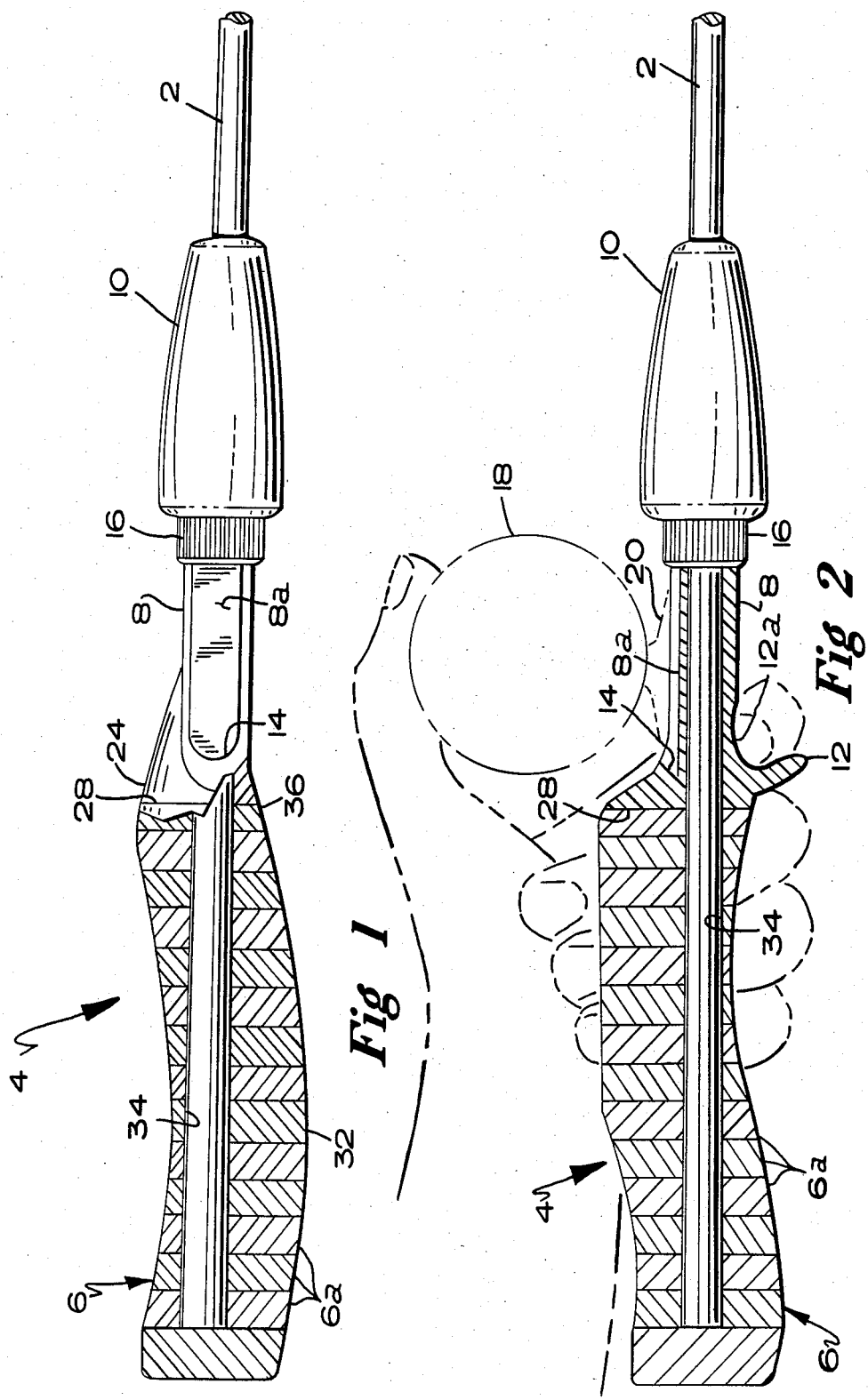

CONTOURED FISHING ROD HANDLE

This application is a continuation-in-part of copending application Ser. No. 610,609, filed on May 15, 1984, now U.S. Pat. No. 4,577,432 as a continuation of application Ser. No. 302,634, filed Sept. 15, 1981, now abandoned.

BACKGROUND OF THE INVENTION

The aforesaid copending application discloses a fishing rod and handle construction wherein the rod blank or shaft extends all of the way through the reel seat segment of the handle and into the butt grip segment at the rear end of the rod assembly. The strength and sensitivity of such a blank-thru rod and handle construction is enhanced and the further advantages of increased user grip comfort and reduced gripping distance for thumb control of casting reels are provided in the copending application by a specially contoured butt grip which is offset upwardly behind the reel seat. Such a construction also provides a mechanical advantage in stabilizing the rod and handle assembly against its tendency to twist in the user's hand due to the weight of the reel.

The handle construction disclosed herein is directed to improving the palming grip for casting and spinning rods, as well as the gripping function when casting. When utilizing a casting rod with either a bait casting reel or a spin casting reel mounted on a reel seat on top of the rod or rod handle, the user grips the butt grip, the trigger and trigger indent of the reel seat, and part of the reel seat with his right hand when casting with the right hand. His thumb engages the reel thumb bar and the spool of the reel to control the release of the line, or a thumb switch on an enclosed spin casting reel. It is the index finger which contacts and holds the trigger and trigger indent and the underside of the reel seat when casting. When retrieving and playing a fish with such a casting rod, it is normal to switch the rod to the left hand. The left hand then grips the handle and reel in a left hand palming position. In such a position, the user's left palm is positioned against the left side of the butt grip, the reel seat, and the reel. The left thumb is positioned against the top of the reel or the top fo the reel spool, with the fingers of the left hand gripping and extending under and around the butt grip behind the reel seat, as well as around the trigger and trigger indent of the reel seat.

When using a pure spinning rod and handle assembly having a spinning reel suspended from a reel seat under the rod and rod handle, the user simultaneously grips the butt grip, the reel seat, a portion of the reel housing, and its support with his right hand when casting with the right hand. The user's right palm is positioned to the right of the butt grip and the reel seat. The user's thumb rests on top of the butt grip with the fingers circling under and embracing the reel seat and the bottom side of the butt grip. The index finger is extended forwardly under the reel seat in contact with the fishing line to control the release of the line from the spinning reel during casting.

The state of the art is such that the problems and concerns associated with the palming grip positions have not been satisfactorily addressed. Traditional, offset handles for casting rods did improve user comfort and reduce the thumb to reel gripping distance. This was accomplished by lowering the reel seat area on the handle so as to position the reel below the plane of the rod shaft or blank. However, the rod blank was not extended all the way through the handle because the reel was positioned below the plane of the rod. As a result, prior to the offset, blank-thru rod construction disclosed in our aforesaid application Ser. No. 302,634, offset handles, including those with angled or pistol grip type of handles, had always been attached to the rod as a separate piece with the rod being secured to the front end of the handle by a chuck or a ferrule. U.S. Pat. Nos. 2,667,713, 4,044,488, and 2,593,747 issued to Stephens, Ohmura, and Godfrey, respectively, disclose examples of such handle and rod constructions.

Straight handled casting rods having the rod blank extending all of the way through the handle are well known. U.S. Pat. No. 2,018,923 discloses a rod and handle of such construction. The location of the reel on top of the rod handle in such casting rods causes an excessive distance between the bottom of the straight handle and the top of the thumbing area of the reel spool. This results in an uncomfortable grip when casting, and enhances the tendency of the rod to twist in the user's hand because of the weight of the reel on top of the rod.

U.S. Pat. No. 4,516,351 discloses a blank-thru rod and handle assembly with the rod blank exposed in the gripping area so that at least a portion of the user's hand will contact the rod to increase sensitivity. No provision is made to improve the palming grip position by the construction or contour of the reel seat. U.S. Pat. No. 4,463,512 issued to McCreery discloses a spinning rod with the rod resting in a groove in the bottom of a handle in such a way that the rod is exposed for contact with the hand of the fisherman.

In recent years, low profile fishing reels have been developed and marketed. Such low profile reels address the palming position to the extent that they reduce gripping distances and reduce rod twist by lessening the overall height of the reel.

Also, low profile reel seats have been developed in recent years. Such low profile reel seats address the palming position problems by reducing the gripping distances. This is achieved by reducing the wall thickness of the reel seat in the vertical direction.

Having in mind the aforesaid state of the art, and the need currently existing for improving the comfort and stability of casting and spinning rods, particularly with respect to the palming grip position of the user, an improved handle with a specially contoured reel seat and butt grip has been developed as disclosed herein.

BRIEF SUMMARY OF THE INVENTION

This invention has as its primary objective the improvement of user comfort and rod stability and mechanical advantage for both casting rods and spinning rods. In particular, such improvements are provided with respect to the palming grip position when utilizing casting and spinning rods.

A further object is to improve blank-thru, offset fishing rod and handle assemblies by improving twist resistance and mechanical advantage by way of a comfort conforming shape in the palming grip position when the palm of the hand is in contact with the butt grip, reel, and reel seat.

Another objective is to reduce grip distances and improve user grip proximity to the rod blank for enhanced sensitivity on blank-thru handle and rod construction.

The aforesaid primary objectives are achieved through a handle construction having a smoothly contoured projection conforming to the palm of the user in the area where the rear end of the reel seat segment of the handle joins the forward end of the butt grip segment. This is preferably accomplished by providing an outwardly curved, laterally offset projection on one side of the butt grip segment of the handle behind the reel seat segment, and an outwardly curved, laterally offset complimentary projection on the same side of the reel seat segment of the handle as the aforesaid butt grip projection. The complimentary projection on the reel seat merges with the curved projection on the butt grip segment as an extension thereof to define a continuous, smoothly contoured projection adapted to fit comfortably into the palm of the hand of the user when palming the butt grip, reel, and reel seat. The handle is so constructed as to accomplish this without detracting from casting grip positions.

The aforesaid palming grip projection enhances mechanical stability by better resisting twisting of the rod and reel due to the weight of the reel because the palm bears against the aforesaid lateral projection or bulge when retrieving or playing a fish.

In a preferred and particularly advantageous embodiment, the aforesaid palming projection on one side of the handle is curved to a helical configuration, with both the projection on the butt grip segment and the projection on the same side of the reel seat segment being segments of a helix. The helical shape enhances comfort and rod stability.

In a preferred embodiment of the invention, the aforesaid palming grip projection is utilized on a handle assembled on a rod in a blank-thru construction with the rod blank extending through the reel seat and rearwardly into the butt grip segment of the handle. Such a construction provides increased strength and sensitivity.

As a further preferred and beneficial construction the aforesaid, blank-thru handle construction is utilized on a pistol grip or angled handle which is offset upwardly from the longitudinal, central axis of the rod blank positioned within the handle, at a location on the butt grip behind the reel seat segment to elevate the butt grip at that location. This reduces the thumb to spool gripping distance to increased comfort and to facilitate thumbing control of a casting reel positioned on top of the reel seat segment.

Advantageously, with the aforesaid blank-thru rod and handle construction, the reel seat segment and the adjacent portion of the butt grip segment have a reduced side wall thickness on the opposite side thereof from that on which the aforesaid curved palming grip projections are provided. This construction assures that the user's fingers will be positioned close to the rod blank in the palming position, thereby providing increased sensitivity to rod flexing and vibrations.

These and other objects and advantages of the invention will be readily understood as the following description is read in conjunction with the accompanying drawings wherein like reference numerals have been utilized to designate like elements throughout the several views.

BRIEF DESCRIPTION OF THE DRAWINGS

FIG. 1. is a top, plan view, partially in section showing the improved handle and rod assembly of this invention; and FIG. 2 is a side elevation view, partially in section, showing the rod and handle assembly of FIG. 1.

DESCRIPTION OF THE PREFERRED EMBODIMENTS

Referring now to the drawings, there is shown in FIGS. 1 and 2 a preferred embodiment of a casting rod incorporating the improved reel seat and butt grip construction features on a fishing rod handle. For purposes of this application, and in conformance with generally used trade terminology, a casting rod is defined as one utilizing either a bait casting reel or a spin casting reel mounted on a reel seat on top of the rod or rod handle. Bait casting reels are those having an open spool which the user must thumb when casting. Spin casting reels are fully enclosed and normally include a button which the user must actuate with his thumb to release the line when casting.

As shown in FIG. 1, the fishing rod and handle asembly is comprised of a rod blank or shaft 2, and a handle generally indicated by reference numeral 4. The handle is comprised of a butt grip segment 6, and a reel seat segment 8 positioned forwardly of the butt grip. A foregrip 10 is also shown on the rod blank in front of the reel seat 8. Various known materials may be used for the rod blank and the handle. The rod blank may be made of graphite, metal, or plastic material with the appropriate physical qualities of strength and flexiblity. The handle may be molded from plastic material, or formed from cork. In the preferred embodiment, especially for large scale production, the rod blank would be made of graphite, the reel seat 8 would be formed from molded plastic, and the butt grip segment 6 would be molded as a single plastic component. In FIGS. 1 and 2, the butt grip segment 6 is shown as comprised as a plurality of disks 6a which could be cork-shaped and glued together to form a continuous butt grip of the contour shown. Foregrip 10 would normally be made of the same material as butt grip segment 6.

The elongated handle 4 is constructed so that reel seat 8 is located forwardly of butt grip segment 6 between butt grip segment 6 and foregrip 10. The reel seat is formed to include a downwardly extending trigger 12 on casting rods, which would normally be engaged by the forefinger of the user. On its top surface, reel seat 8 has a cutaway recess 14 at the rear end thereof; and at its front end, real seat 8 has external threads (not shown) on which an internally threaded hold-down ring 16 is threadedly adjustable back and forth on the reel seat. A casting reel, which could be a bait casting reel or a spin casting reel would be secured on the top surface of reel seat 8 as indicated in phantom lines in FIG. 2. The upwardly facing reel seat surface 8a would receive the foot 20 of the casting reel, with the feet of the casting wheel being received within recess 14 and under hold-down ring 16 to secure the reel in place. The use of such a threaded hold-down or lock ring 16 movable back and forth on the reel seat, in combination with a recess 14 to secure the foot or base of a casting reel in place on a reel seat is conventional and widely utilized.

As is shown in the top view of the rod and handle assembly depicted in FIG. 1, butt grip segment 6 is provided at its forward end, behind reel seat segment 8, with a laterally offset projection 22 on one side thereof. Projection 22 is preferably curved outwardly as shown. A complimentary and mating lateral projection 24 extends outwardly from the side wall of reel seat 8 on the same side of handle 4 as projection 22. Reel seat lateral projection 24 is also curved as shown, and is contoured to merge and mate smoothly with the forward end of butt grip projection 22 so as to form a continuous, smoothly contoured projection generally indicated by reference numeral 26. Projection 26 is shaped so as to conform comfortably to the palm of the hand of the user when engaging the handle with a left hand palming grip as indicated in phantom lines in FIG. 2. It is to be noted that the left hand and right hand references in this description are made with respect to a view of the top view of the handle of FIG. 1 from the left end thereof.

It will be noted that the palm of the user extends around the palm grip protrusion 26 on both sides of the juncture line 28 where butt grip segment 6 and reel segment 8 are joined together. As may be understood by reference to FIG. 2, when utilizing the palming grip with the left hand, the palm will extend around projection or protrusion 26 in a comfortable, snug fit therewith, with the palm positioned against the left side of the butt grip 6, reel seat 8, and reel 18. The user thus simultaneously holds the butt grip, the reel seat, and the reel. The user's thumb is positioned against the top of the reel as shown, or the top of the reel spool depending on whether a closed spinning reel or open spool bait casting reel is being utilized. The four fingers on the left hand extend under and around and grip the butt grip, underside of the reel seat 8, and the trigger 12 as well as the trigger indent 12a as indicated in phantom line on FIG. 2. In a commonly applied palming grip the last two fingers of the left hand will curl under butt grip segment 6 and up around the right side thereof, with the other two fingers wrapped under and around reel seat 8 forwardly of trigger 12. In FIG. 2, three fingers are shown to the rear of the trigger 12. User preference dictates whether one, two, or all of the fingers would be positioned forwardly of the trigger in the palming position. With the palm of the user thus bearing snugly against curved projection 26, the user's hand will act to provide a mechanical advantage in overcoming any tendency of the rod to twist in his hand due to the weight of the reel on top of the rod. When thus palming the rod handle with the left hand, as would be done when playing fish, the right hand would be free to operate the crank on the right side of the reel 18 to retrieve the line. Such a right handed fisherman would normally grip the handle with his right hand when casting. In the right handed casting position, the palm of the user would wrap around the right hand side of the butt grip, with the thumb over the top of the reel to control the release of line from the reel spool, and the right forefinger engaged around the reel seal trigger 12. After casting, the user would normally switch the rod to his left hand for the left hand palming position as described above.

It is to be noted that reels are now being manufactured with the cranks on the left side for left handed fisherman or for persons who want to reel with their left hand. With such reels, the left handed user would cast with the left hand and then switch to the right hand for retrieving and playing fish. For such left handed persons, the contour of the handle as shown in FIG. 1 would be reversed so that the butt grip and reel seat projections 22 and 24 would be on the right side of the reel to form a smoothly contoured palming protrusion 26 on the right hand side of the handle for engagement in the right palm of the user. For either left handed or right handed users, the curved, lateral projection at the juncture of the front end of the butt grip segment and the rear end of the reel seat segment enhances the comfort of the user when utilizing the palming grip and increases twist resistance through the mechanical advantage of the palm bearing against the palming projection or protrusion 26.

Although the palming grip projection 26 may take various contours, a curved contour in the form of a helix is particularly effective with respect to comfort and mechanical advantage. With such a contour, both the butt grip curved projection 22 and the reel seat curved projection 24 would be segments of a helix. The entire butt grip segment 6 would be of helical configuration as shown in the top view of FIG. 1 so as to be curved inwardly at 30 on the left side of the butt grip and curved outwardly at 32 on the right side of the butt grip. The curved palming grip projection 26 would also be a segment of the helix and would contour to provide a helical extension of the curve 30 on the left side of butt grip segment 6. The helical shape of the butt grip is particularly effective towards enhancing comfort and mechanical stability.

The fishing rod handle 4 is preferably of the blank-thru type wherein the rod blank extends through the handle. For that purpose, handle 4 is provided with a through bore 34 which extends through reel seat segment 8 as well as through butt grip segment 6. Rod blank 2 extends within handle bore 34 completely through reel seat 8 and rearwardly within butt grip segment 6 as shown in FIGS. 1 and 2. Such a handle and rod blank assembly provides a particularly strong and sensitive fishing rod structure. Sensitivity to flexing and vibrations on the rod blank is enhanced with the handle contour of this invention. That is accomplished by providing side walls of reduced thickness on the handle at the junction area 28 between the forward end of butt grip segment 6 and the rear end of reel seat segment 8, as indicated by reference numeral 36 in FIG. 1. It will thus be seen the handle 4 has a wall thickness at the area 36 at the rear end of reel seat segment 8 and at the adjacent portion of butt grip segment 6 behind the reel seat which is reduced on the side of handle 1 opposite the side on which palming grip projection 26 is formed. Thus, with a left hand palming grip as illustrated in phantom lines in FIG. 2, the user's fingers curled under and around the rear end of the reel seat and the adjoining, forward end of the butt grip segment will be overlying the handle side wall area 36 of reduced wall thickness, and thus positioned very close to rod blank 2. The fingers of the user thus will be able to sense very slight flexing and vibration of the rod blank.

As may best be understood by reference to FIG. 2, butt grip segment 6 is also offset upwardly in a vertical direction with respect to the central axis of handle bore 34 and rod blank 2. At least at the forward end of butt grip segment 6 behind reel seat 8, butt grip segment 6 is thus elevated to provide more butt grip material above rod blank 2 than below it. This provides several advantages. When gripping the handle 4 for casting, the gripping distance from the underside of the butt grip 4 to reel 18 will be significantly reduced with such a vertically offset butt grip segment. The thumb of the user will be moved closer to the spool of reel 18 so as to control the release of line from the spool either by directly thumbing the spool on a bait casting reel or by operating a control button with the thumb to release the line on an enclosed spin casting reel. The elevated butt grip relative to the reel will also result in increased mechanical advantage towards resisting the tendency of the rod to twist in the user's hand due to the weight of the reel on top of the rod.

The contoured handle described above with the curved, laterally offset projection is equally applicable and beneficial to spinning rods having a reel seat on the bottom surface of the handle facing downwardly to receive a spinning reel suspended from the underside of the handle. Such a spinning rod application and construction can be understood by viewing FIG. 1 as if it were a bottom view of a spinning rod handle and rod assembly. The foot or base of the spinning rod would be supported within reel seat 8, resting against downwardly facing seating surface 8a. Cutaway recess 14 and locking or hold-down ring 16 would be utilized to engage and secure the feet of the spinning reel in the same manner as is done with respect to the base of a casting ree. For such spinning rod applications, the reel seat 8 would be tubular, and would not have a trigger. Spinning reels are normally provided with the crank on the left side of the reel. A right-handed user would grip the rod handle in his right hand for casting as well as for retrieving and playing fish. Thus, with respect to FIG. 1 considered as a bottom view of the spinning rod and handle assembly, laterally offset projection 26 would be on the correct side of the handle for engaging the palm area of the right hand of the user. The rod blank 2 would extend through the bore 34 of the handle through the reel seat 8 and into the butt grip segment 6 in the same way as shown with respect to FIG. 1.

Spinning reels are available with cranks on either side of either right hand or left hand cranking of the reel. For left hand users, having the crank on the right side of the reel, the laterally offset projection 26 would be on the opposite side of the handle from that described above with respect to FIG. 1 as a bottom view.

For purposes of this description with respect to spinning rods, spinning rods are considered to be those which utilize a spinning reel which is suspended below the rod and requires the user in some cases to control the release of the line with a finger. Line control is normally accomplished with the forefinger. The palm of the hand would be positioned more forwardly over the reel seat area than with casting rods with the fingers of the hand encircling the bottom of the reel seat and the forward end of the butt grip so that the forefinger will be in position to catch and control the line coming off of an open faced spinning reel. The gripping of the handle is made more secure and comfortable because of the fitting of the curved, lateral projection 26 into the palm area of the user's hand. Also, such engagement of the user's hand with the lateral projection 26 provides the mechanical advantage of stabilizing the rod against the tendency of it to twist in the hand if it is rotated slightly so that the reel is not positioned directly under the rod handle. With the rod rotated slightly so that the reel is suspended to one side, the weight of the reel can cause the rod to twist in the user's hand. The engagement of the curved, lateral projection snugly within the user's hand offsets that tendency.

It is to be understood that various changes may be made in the size, shape, and arrangement of the rod handle construction disclosed herein without departing from the spirit and scope of the invention as defined by the following claims.

What is claimed is:

1. A handle for a fishing rod comprising:
    an elongated handle having a butt grip segment on the rear end thereof;
    a reel seat segment on said handle located forwardly of said butt grip segment;
    an outwardly curved, laterally offset projection on one side of said butt grip segment of said handle behind said reel seat segment; and
    an outwardly curved, laterally offset complimentary projection on the same side of said reel seat segment of said handle as said butt grip segment projection, said complimentary projection merging with said curved projection on said butt grip segement as an extension thereof to define a continuous, smoothly contoured projection adapted to fit snuggly into the palm of the hand of the user when palming the butt grip, reel, and reel seat.

2. A handle for a fishing rod as defined in claim 1 wherein:
    said curved projections on said butt grip segment and on said reel seat segment are segments of a helix and said resulting, smoothly contoured projection is a partial helix.

3. A fishing rod and handle assembly comprising:
    a fishing rod blank;
    an elongated handle mounted on said rod and having a butt grip segment on the rear end thereof;
    a reel seat segment on said handle located forwardly of said butt grip segment;
    an outwardly curved, laterally offset projection on one side of said butt grip segment of said handle behind said reel seat segment; and
    an outwardly curved, laterally offset complimentary projection on the same side of said reel seat segment of said handle merging with said curved projection on said butt grip segment as an extension thereof to define a continuous, smoothly contoured projection adapted to fit into the palm of the hand of the user when palming the butt grip, reel, and reel seat.

4. A fishing rod and handle assembly as defined in claim 3 wherein:
    said curved projection on said butt grip segment and on said reel seat segment are segments of a helix and said resulting smoothly contoured projection is a partial helix.

5. A fishing rod and handle assembly as defined in claim 3 wherein:
    said complimentary projection on said reel seat segment extends outwardly from the side of said reel seat segment in a direction towards said butt grip segment.

6. A fishing rod and handle assembly as defined in claim 3 and further comprising:
    a rod receiving hole extending longitudinally within said handle, said hole passing completely through said reel seat segment and rearwardly therefrom into said butt grip segment; and
    said rod blank is positioned within said hole with said blank having a rearmost section received and contained within said hole within both said butt grip segment and said reel seat segment of said handle, whereby increased strength and sensitivity are imparted to said fishing rod and handle assembly.

7. A fishing rod and assembly as defined in claim 6 wherein:
    said reel seat segment and the adjacent portion of said butt grip segment behind said reel seat segment have a reduced side wall thickness on the opposite side thereof from said projections, whereby with the user's palm engaging said smoothly contoured projection and the fingers curled under and around the reel seat segment and said adjacent portion of said butt grip segment, the user's fingers will be positioned in close proximity to said rod blank, thereby providing increased sensitivity to rod blank vibrations.

8. A fishing rod and handle assembly as defined in claim 5 wherein:
   said curved projections on said butt grip segment and on said reel seat segment are segments of a helix and said resulting, smoothly contoured projection is a partial helix.

9. A fishing rod and handle assembly as defined in claim 3 wherein:
   said fishing rod is a casting rod and said reel seat segment is on the top surface of said handle facing upwardly to receive a casting reel on top of said handle.

10. A fishing rod and handle assembly as defined in claim 3 wherein:
    said fishing rod is a spinning rod, and said reel seat segment is on the bottom surface of said handle facing downwardly to receive a spinning reel suspended from the underside of said handle.

11. A fishing rod and handle assembly as defined in claim 9 wherein:
    said butt grip segment of said handle is offset upwardly from the longitudinal, central axis of said rod receiving hole and of said rod blank positioned therein, at least at a forward location on said butt grip segment behind said reel seat segment to elevate said butt grip segment at said location, whereby the thumb to reel spool distance is reduced to facilitate thumbing control of a casting reel on top of said reel seat segment.

* * * * *